April 13, 1948.  C. J. BURGESS  2,439,538
DEODORIZING COMPOSITION OF MATTER FOR FOOD STORAGE COMPARTMENTS
Filed July 17, 1943
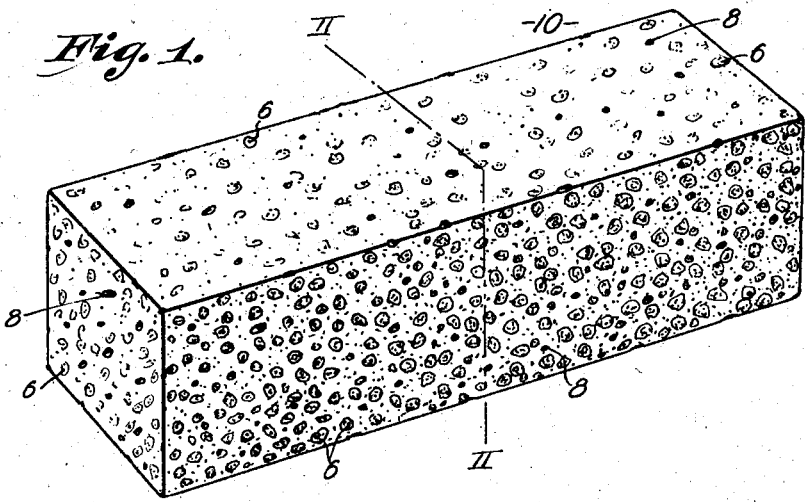
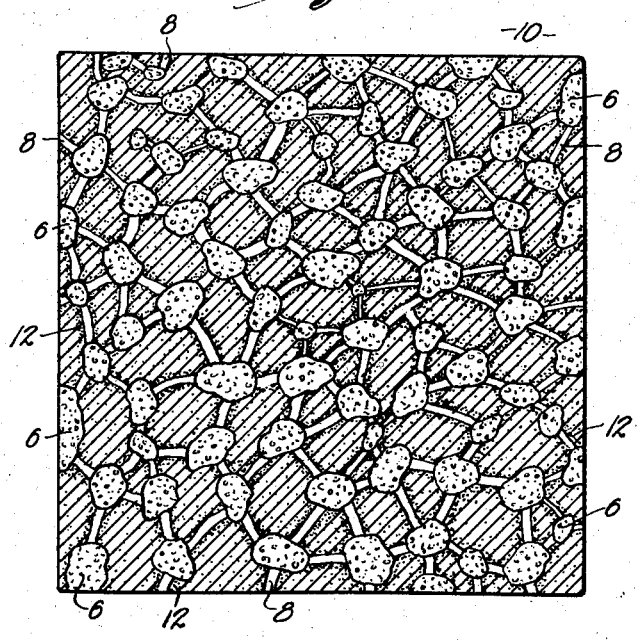
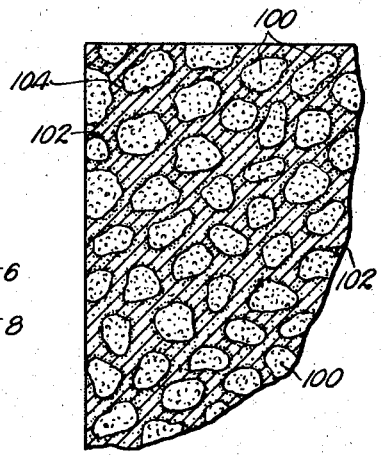
INVENTOR.
C. J. Burgess
BY
ATTORNEY.

Patented Apr. 13, 1948

2,439,538

UNITED STATES PATENT OFFICE 2,439,538

DEODORIZING COMPOSITION OF MATTER FOR FOOD STORAGE COMPARTMENTS

C. J. Burgess, Liberty, Mo.

Application July 17, 1943, Serial No. 495,228

4 Claims. (Cl. 252—265)

This invention relates to deodorizing composition of matter particularly adapted for use in food storage compartments where the air is directed through a large number of ramified passages, the walls whereof are provided with absorptive material.

A yet further aim of this invention is to provide a composition of matter having as one of the elements thereof, a quantity of calcined, crushed vermiculite, to provide passages in the composition when it is molded into blocks or the like, which passages direct air against activated carbon to remove therefrom entrained or intermixed gases.

The method of producing the deodorizing composition of matter and its physical characteristics will be made clear during the course of the following specification, referring to the accompanying drawing, wherein:

Fig. 1 is a perspective view of a deodorizing unit made from a composition of matter mixed in accordance with this invention.

Fig. 2 is an enlarged fragmentary detailed sectional view through the unit taken on line II—II of Fig. 1; and Fig. 3 is a similar cross sectional view illustrating a deodorizing unit made in accordance with a modified form of the invention.

Articles produced in accordance with my U. S. Letters Patent No. 1,999,499, have proven commercially satisfactory over a long period of time, and the deodorizing units having Portland cement, activated carbon, calcium carbonate and powdered aluminum, are capable of functioning as an efficient deodorizer for food compartments of refrigerators or the like.

The specific manner of providing ramified cavities or passages within the deodorizing unit and the use of calcined, crushed vermiculite as an ingredient, capable of amplifying the surface area to be contacted by the gases in the chamber containing the deodorizing unit, comprise the improvements over my aforesaid Letters Patent.

When using both vermiculite and powdered aluminum in the production of the porous unit, a batch should consist of the following ingredients in the proportions mentioned:

| | |
|---|---|
| Activated carbon | lbs.  12½ |
| Calcium carbonate | lbs.  25 |
| Portland cement | lbs.  50 |
| Vermiculite | lbs.  20 |
| Powdered aluminum | oz.  ¼ |

The activated carbon is in powdered form and is available on the open market. The said activated carbon has the property of absorbing gases from the air and of liberating said absorbed gases when subjected to fresher air or exposed to sunlight.

The calcium carbonate is employed as an element precluding the sticking of the plastic mass to any molds that may be used, and also as a means of adding bulk without increasing the solidity of the mass.

Portland cement serves in the capacity of a binder.

The vermiculite, being exceedingly porous and light, contributes its porosity and the ramified passages therethrough to the pores of the remaining part of the mass in establishing ways for the air.

The powdered aluminum combines with water when the mass is mixed and, during the setting period, gas will be created to establish minute passages terminating at the surface of the molded unit. Sufficient water to render the mixture plastic and to form gas when combined with the powdered aluminum is used. The amount of water may vary to suit conditions of handling, temperature, humidity and moisture content of the constituents.

The vermiculite is obtainable on the open market and is well-known to be a fluffy mass, particles whereof are readily mixable with the carbon, calcium carbonate and Portland cement. The vermiculite will serve the purpose of establishing ramified passages or means for the ingress and egress of the air being treated. Where aluminum is not available, therefore, the vermiculite may be slightly increased in volume.

Referring to the drawing, the particles or granules 6 of vermiculite are embedded in the unit with many of the ramified passages 8 terminating at the surface of the granules in such fashion as to establish a continuous circuitous path of travel for the air from one face of the block or unit 10 to another face thereof. These passages 8 are lined with a relatively concentrated mass of activated carbon 12 deposited when the said passages 8 are created by the oxidization of the aluminum. It is also notable that a concentrated amount of activated carbon will appear around the granules 6 of vermiculite, due to floatation caused by water entering the interstices of the granules 6 during the mixing and forming steps in the production of unit 10.

The granules 100 of vermiculite in the modified form of the invention have concentrated masses of activated carbon 102 immediately adjacent thereto and the proximity of these granules 100 is such as to establish a number of ramified passages through the unit 104, which passages comprise in the main, the interstices of granules 100.

Intermixing the ingredients above set down in the manner described, will produce the units illustrated in the drawing, and the formula may be reduced to the following form:

| | Parts |
|---|---|
| Activated carbon | 1 |
| Calcium carbonate | 2 |
| Portland cement | 4 |
| Vermiculite | 2 |

The vermiculite is preferably ground or crushed so that it will pass a ten mesh screen and will move over a twenty mesh screen. Granules of different sizes may be employed but the foregoing specification is preferable.

Having thus described the invention, what is claimed as new and desired to be secured by Letters Patent is:

1. A composition of matter of the character described consisting of one part by weight of activated carbon, serving as an absorbing agent; four parts Portland cement, serving as a binder for the mass; two parts calcium carbonate, serving as a filler; two parts granular, calcined vermiculite, serving as means for forming a multiplicity of ramified interconnected cavities throughout the mass, there being a relatively greater concentration of activated carbon around the granules of calcined vermiculite than elsewhere in said mass.

2. In a deodorizing unit of the character described having a polygonal cementitious body, a plurality of granules of expanded vermiculite distributed throughout the body to form portions of interconnected passages extending throughout the body with the termini of some of the passages at the surface of the body, said body containing distributed activated carbon particles, said passages having their wall surfaces lined with particles of activated carbon in greater concentration than the concentration of carbon particles elsewhere in the said body, said granules of expanded vermiculite having a like concentration of activated carbon over the outer surfaces thereof.

3. A deodorizing unit of the character described comprising a body including a vehicle of Portland cement; granular calcined vermiculite, distributed throughout the body; and a plurality of ramified interconnected passages formed in the body, said body containing distributed activated carbon particles, there being a greater concentration of carbon particles along the walls of the passages and around the granules of calcined vermiculite than at any other place within the body.

4. A deodorizing unit for food storage compartments comprising a body having a plurality of ramified, interconnected passages formed throughout the same with their termini at the surface of the body; and a relatively heavy concentration of particles of activated carbon lining the surfaces of said passages, said body consisting of a vehicle of four parts Portland cement, forming a binder, two parts calcium carbonate, serving as a filler, two parts granular calcined vermiculite, a small amount of powdered aluminum, and water, said water and aluminum being in sufficient amounts prior to setting of the body to render the mixture plastic and to form gas for the purpose of creating the aforesaid passages, the said aluminum and water forming gas in sufficient volume to deposit carbon particles in concentrated amounts along the walls of said passages and around the granules of calcined vermiculite as the mass of said materials is setting to form a unitary mass.

C. J. BURGESS.

REFERENCES CITED

The following references are of record in the file of this patent:

UNITED STATES PATENTS

| Number | Name | Date |
|---|---|---|
| 1,839,887 | New | Jan. 5, 1932 |
| 1,892,138 | Darling | Dec. 27, 1932 |
| 1,971,900 | Cerveny | Aug. 28, 1934 |
| 1,980,889 | Thomson | Nov. 13, 1934 |
| 1,999,499 | Burgess | Apr. 30, 1935 |
| 2,214,925 | Gutrie | Sept. 17, 1940 |